United States Patent [19]

Harshberger, Jr. et al.

[11] Patent Number: 5,863,452
[45] Date of Patent: Jan. 26, 1999

[54] ISOSTATIC PRESSURE RESIN TRANSFER MOLDING

[75] Inventors: Robert L. Harshberger, Jr.; Keith A. Olsen, both of Lakewood; John E. Potter, Camarillo; Martin J. McLaughlin, Los Angeles; Stephen P. Grossman, El Segundo, all of Calif.

[73] Assignee: Northrop Grumman Corporation, Los Angeles, Calif.

[21] Appl. No.: 837,402

[22] Filed: Apr. 17, 1997

[51] Int. Cl.⁶ .............................. B22D 19/00; B22C 9/08
[52] U.S. Cl. .............................................. 249/83; 249/105
[58] Field of Search ....................... 249/83, 105

[56] References Cited

U.S. PATENT DOCUMENTS

| | | | |
|---|---|---|---|
| 3,666,600 | 5/1972 | Yoshino | 156/382 |
| 4,132,755 | 1/1979 | Johnson | 264/553 |
| 4,201,823 | 5/1980 | Russell | 428/246 |
| 4,311,661 | 1/1982 | Palmer | 264/510 |
| 4,312,829 | 1/1982 | Fourcher | 264/571 |
| 4,808,362 | 2/1989 | Freeman | 264/257 |
| 4,942,013 | 7/1990 | Palmer et al. | 264/511 |
| 5,000,902 | 3/1991 | Adams | 264/510 |
| 5,052,906 | 10/1991 | Seemann | 425/112 |
| 5,080,851 | 1/1992 | Flone et al. | 264/258 |
| 5,087,193 | 2/1992 | Herbert, Jr. | 425/543 |
| 5,152,949 | 10/1992 | Leoni et al. | 264/257 |
| 5,194,190 | 3/1993 | Kim | 264/25 |

*Primary Examiner*—Johann Richter
*Assistant Examiner*—Joseph Murray
*Attorney, Agent, or Firm*—Terry J. Anderson; Karl J. Hoch, Jr.

[57] ABSTRACT

Method and apparatus for making a fiber reinforced composite wherein fiber reinforcement material is disposed in a molding cavity formed between a substantially rigid molding tool and a compliant molding tool in a pressurizable chamber of a pressure vessel, such as an autoclave. Uncured polymer resin is introduced under pressure to the molding cavity by a resin pump disposed in the chamber or external thereof so as to initially infiltrate the fiber reinforcement material with the resin. The chamber is gas pressurized to provide isostatic pressure on the rigid and compliant tools during resin infiltration of the fiber reinforcement material. The resin-infiltrated fiber reinforcement material then is heated in the chamber to cure the resin matrix. Large surface area composites of the aerospace skin structure type can be made using the present invention.

11 Claims, 2 Drawing Sheets

ISOSTATIC PRESSURE RESIN TRANSFER MOLDING

FIELD OF THE INVENTION

The present invention relates to manufacture of fiber reinforced composites by resin transfer molding.

BACKGROUND OF THE INVENTION

Resin transfer molding processes are widely used in the manufacture of fiber reinforced composites. One particular resin transfer molding process involves initially positioning a dry fiber reinforcement material, such as a preform or a lay-up of plys, in a molding cavity defined between opposed, precision-machined matched metal molding tools. The molding tools are held together such that the tools define the molding cavity which has a configuration of the desired composite shape to be made. A flowable thermosetting resin then is pumped into the molding cavity under relatively low pressure (e.g. usually under 100 psi) effective to cause the resin to flow through and saturate the fiber reinforcement material. The matrix-infiltrated fiber reinforcement material then is heated to cure the resin to a thermoset condition.

As a result of the resin pressure within the molding cavity and high tool clamping pressure, conventional resin transfer molding tools comprise relatively massive, machined metal members to resist forces and distortion under the pressure and temperature conditions of the molding operation. Moreover, as mentioned, the molding tools typically are disposed in a hydraulic press that exerts a clamping force thereon during the molding operation to prevent separation of the tools from pressure within the mold cavity and maintain an appropriate seal therebetween.

Such resin transfer molding tools are disadvantageous in that they are costly to fabricate. Moreover, the tools are clamped together in a press during the resin transfer molding operation so as to resist the resin pressure within the molding cavity from separating the tooling details.

In addition, such conventional resin transfer molding tools necessarily must surround the molded composite being fabricated and inherently are limited in the dimensions of the composite that can be produced. For example, conventional resin transfer molding processes using such massive molding tools have not proved feasible for the production of fiber reinforced composites of the aerospace skin type that have a large surface area and a relatively small thickness dimension. In particular, conventional resin transfer molding processes have not been used heretofore in the production of fiber reinforced composites generally having a surface area greater than 10 square feet (for flat composite surfaces) and thickness dimension less than approximately 0.125 inch.

An object of the present invention is to provide a resin transfer molding method and apparatus that overcome the aforementioned disadvantages of conventional resin transfer molding processes employing massive matched metal molding tools.

Another object of the present invention is to provide a resin transfer molding method and apparatus that overcome the aforementioned disadvantages and limitations of conventional resin transfer molding processes with respect to production of fiber reinforced composites having a large surface area and small thickness dimension.

SUMMARY OF THE INVENTION

The present invention provides method and apparatus for making a fiber reinforced composite wherein a resin-infiltrated fiber reinforcement material is formed using rigid and compliant molding tools disposed in a pressure vessel and isostatic fluid pressure in the pressure vessel during at least some portion of resin infiltration of the fiber reinforcement material.

To this end, the present invention provides method and apparatus wherein fiber reinforcement material, such as a fiber reinforcement preform or a lay-up of plys, is disposed in a molding cavity formed at least in part by a complaint or flexible molding tool disposed relative to a substantially rigid molding tool in a chamber of a pressure vessel. Resin is introduced under pressure to the molding cavity by a resin pump or other means disposed in the chamber or external thereof so as to infiltrate the fiber reinforcement material with the resin. The chamber is fluid pressurized by suitable pressurizing means to provide isostatic pressure in the chamber during some portion of resin infiltration of the fiber reinforcement material.

In a particular embodiment of the present invention, the compliant molding tool is disposed on the rigid tool in the pressure chamber. The compliant molding tool may comprise a layer or membrane disposed on and overlying a molding surface of the rigid molding tool to define a molding cavity therebetween to receive the fiber reinforcement material. The membrane can be clamped on the rigid molding tool in opposing relation to the molding surface of the rigid tool that imparts a desired configuration to an outer surface of the composite. Alternately, the complaint tool can comprise a bag or enclosure surrounding or enclosing the fiber reinforcement material with the bag or enclosure being disposed on the molding surface of the rigid tool. The compliant molding tool optionally may include one or more caul members to impart particular features on an inner surface of the composite. The fiber reinforcement material is resin infiltrated by pumping suitable resin to the mold cavity with ambient atmospheric pressure in the chamber. Then, isostatic fluid pressure is established in the chamber at a pressure level greater than the resin pressure in the molding cavity to remove excess resin from the fiber reinforcement material. The resin-infiltrated fiber reinforcement material preferably is cured in the pressure chamber by, for example only, heating the resin-infiltrated fiber reinforcement material therein.

The present invention also provides a resin transfer molded, fiber reinforced composite having a relatively large surface area greater than about 10 square feet and a thickness dimension of less than about 0.150 inch, such as from about 0.100 to about 0.125 inch typical of an aerospace skin structure.

The foregoing and other features and advantages of the present invention will become more apparent from the following description taken with the accompanying drawings.

DETAILED DESCRIPTION OF THE INVENTION

The present invention relates to resin transfer molding method and apparatus wherein a fiber reinforcement material is resin infiltrated in a molding cavity using rigid and compliant molding tools in a pressure vessel in which isostatic fluid pressure is established for at least some portion of the resin infiltration of the fiber reinforcement material. The present invention encompasses resin transfer molding and such variants thereof as so-called high speed resin transfer molding, press molding, squeeze molding, structural reaction injection molding using a two component (resin and catalyst) system as well as other processes characterized by fiber reinforcement material being positioned in a molding cavity and then combined with resin in the molding cavity to form a fiber reinforced composite article or product.

Apparatus and method of the present invention utilize a pressure vessel in which particular resin transfer molding tools are disposed and in which an isostatic fluid pressure condition is established in the vessel during at least some portion of resin infiltration of the fiber reinforcement material in the molding cavity, particularly a the end of the resin injection and just prior to resin curing. In a preferred embodiment of the invention, the resin infiltrated fiber reinforcement material also is heated in the vessel to partially or fully cure the resin.

Figure 1:
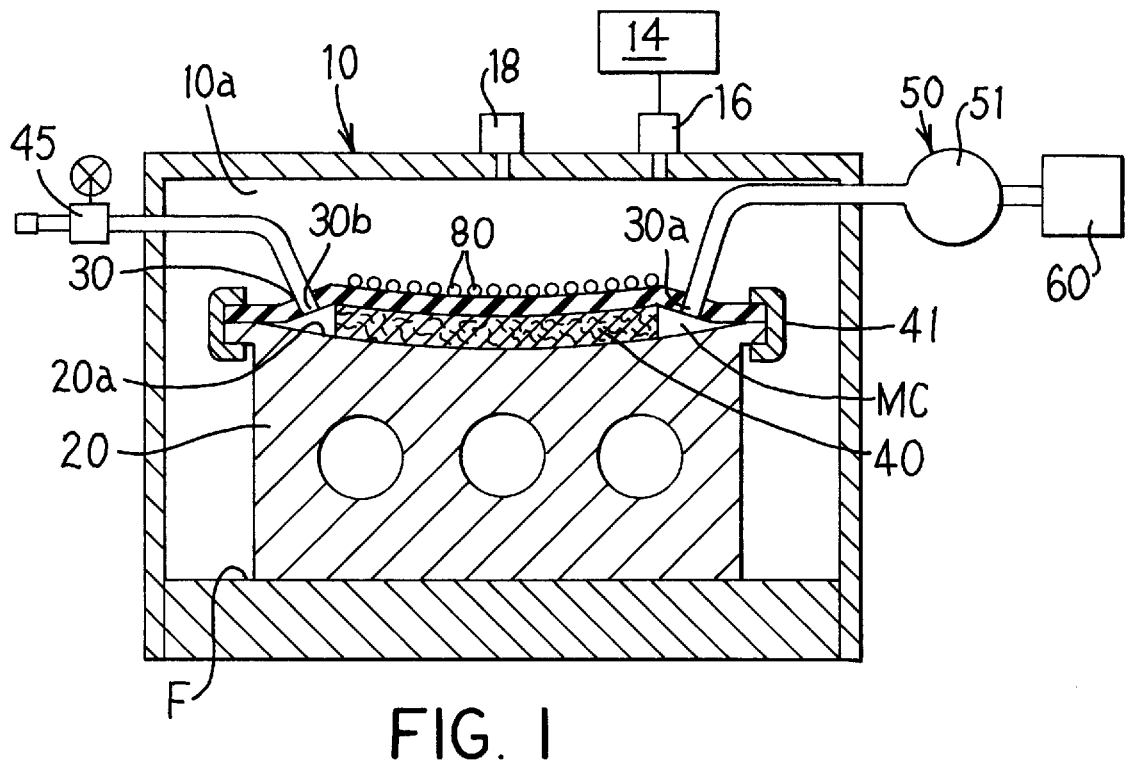
FIG. 1 is a schematic view of apparatus in accordance with an embodiment of the present invention.

FIG. 1 schematically illustrates apparatus in accordance with an embodiment of the present invention. The apparatus comprises a pressure vessel 10 defining a chamber 10a therein. An illustrative pressure vessel for use in practicing the present invention comprises a conventional autoclave that can be gas pressurized and heated to elevated temperature. In FIG. 1, gas pressurizing means for pressurizing chamber 10a is shown schematically as including a conventional gas pressure source 14, such as a compressed shop air, a gas pressure cylinder and the like, and suitable valving 16 for controlling the magnitude of pressurization of the chamber 10a. A vent valve 18 is provided to permit venting of the chamber 10a to the ambient atmospheric pressure outside the vessel 10.

Referring again to FIG. 1, a substantially rigid, one-sided molding tool 20 is disposed on a floor F of the vessel in the chamber 10a. The rigid tool 20 includes a molding surface 20a that will form an outer surface of the fiber reinforced composite to be fabricated and is configured accordingly to this end. The molding surface 20a typically is machined or otherwise shaped to include surface features appropriate to those to be imparted to the composite surface to be formed. The molding tool 20 can be made of metal (e.g. typically tool steel or aluminum) or other suitable substantially rigid material selected in dependence on molded part size, reinforcement and resin materials as well as process parameters such a temperature and pressure. A compliant or flexible molding tool 30 also is disposed in the chamber 10. As shown in FIG. 1, the compliant or flexible molding tool 30 can be disposed on the rigid tool 20 in opposing relation to the molding surface 20a to define a molding cavity MC therebetween. Typically, the compliant molding tool 30 is releasably clamped and sealed on the periphery of the rigid molding tool 20 snuggly against the fiber reinforcement material 40 by one or more releasable C-clamps 41 or other suitable clamping means shown schematically in FIG. 1 for the resin pressure employed. The compliant molding tool 30 typically includes an inlet port 30a for resin entry and an outlet port 30b connected to valve 45 disposed outside the chamber 10a for exiting of excess resin. The outlet port 30b optionally can be connected via the valve 45 to a conventional vacuum pump (not shown) for evacuating the molding cavity MC during infiltration.

The compliant molding tool 30 shown in FIG. 1 typically can comprise a membrane or layer that is substantially impervious to the fluid resin present in the molding cavity MC and to gas (or other fluid) present in chamber 10a for chamber pressurization purposes. Suitable materials for the compliant or flexible molding tool 30 include, but are not limited to, nylon bagging, rubber (e.g. silicone rubber), and rubber composite comprising fiberglass cloth impregnated with rubber.

Figure 2:
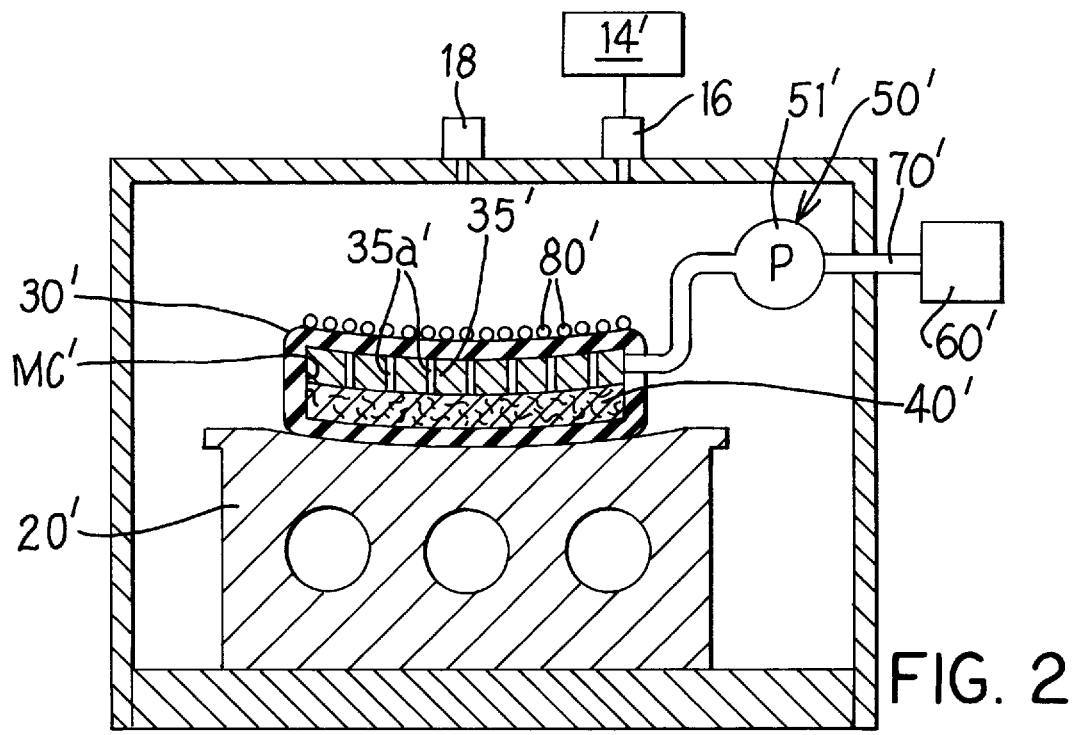
FIG. 2 is a schematic view of apparatus in accordance with another embodiment of the present invention.

Referring to FIG. 2 wherein like reference numerals primed are used for like features of FIG. 1, the compliant or flexible molding tool alternately can comprise a complaint or flexible bag or other enclosure 30' that snuggly surrounds or encloses the fiber reinforcement material 40' and that is disposed on the molding surface 20a' of the rigid molding tool 20'. The bag 30' provides a molding cavity MC' that is shaped on one side by the molding surface 20a' of the rigid molding tool 20' in contact therewith so as to have the desired configuration for the outer surface of the fiber reinforced composite to be fabricated. The compliant molding tool (bag) 30' typically includes an inlet port and an outlet port (not shown but like those described hereabove with respect to FIG. 1).

As illustrated in FIG. 2, one or more conventional caul members 35' can be disposed between the rigid and compliant molding tools 20', 30' for engaging the fiber reinforcement material 40'. In particular, one or more caul members 35' (one shown) can be positioned on a side of the fiber reinforcement material 40' proximate the compliant tool 30' as illustrated in FIG. 2. The caul member is shown having optional passages 35a' for resin flow. The caul member 35' will form an inner surface of the fiber reinforced composite to be fabricated and is configured accordingly to this end as is well known to those skilled in the art. The caul member(s) 35' can be made of substantially rigid material, such as metal and composite graphite reinforced butyl rubber. Similar caul members (not shown) can be provided between the rigid and compliant molding tools 20, 30 of FIG. 1 as those skilled in the art will appreciate.

The molding cavity MC (MC') receives dry fiber reinforcement material 40 (40') that is to be incorporated into the composite structure for reinforcing purposes. The dry fiber reinforcement material can include, but is not limited to, a conventional pre-shaped fiber reinforcement preform, random chopped fibers, one or more woven, braided, knitted, etc. fiber plys, mats, or cloths, and other conventional fiber assemblies or bundles known to those skilled in the art as well as any other grouping of reinforcement fibers. The particular type of fiber employed as the fiber reinforcement material can be selected to suit the requirements of the composite with respect to mechanical or other properties to be provided. Typical reinforcement fibers for use in the practice of the present invention include, but are not limited to, glass fibers, graphite fibers, carbon fibers, aramid fibers (KEVLAR fibers), boron fibers, and the like.

The fiber reinforcement material 40 (40') may include structural inserts (not shown) such as foam cores, rigid cores, strengthening members (stiffeners) and the like as required in the fiber reinforced composite to be fabricated. One or more rigid, removable mandrels (not shown) also can be provided to form hollow fiber reinforced composites as is known to those skilled in the art.

Referring to FIG. 1, resin supply means 50 is provided for introducing a suitable resin under pressure (e.g. up to 100 psi) to the molding cavity MC so as to infiltrate the fiber reinforcement material 40 with resin. The resin supply means 50 can comprise a resin pump 51 located external or outside of the pressure vessel 10 as shown schematically in FIG. 1 to supply resin from a resin source 60, such as a conventional holding tank, to the molding cavity MC for fiber infiltration purposes. Such resin pumps are commercially available and known to those skilled in the art.

Referring to FIG. 2, an alternative resin supply means 50' can comprise a so-called pressure intensifier pump 51' disposed in the chamber 10a' and communicated via conduit 70' to a resin source 60' disposed outside the chamber 10a'. In FIG. 2, the resin source 60' alternately may be disposed in the chamber 10a'. Such a resin source typically will include a one part resin that must be heated to a liquid state for injection. Resins suitable for use in practicing the method of the present invention are well known to those skilled in the art and include many commercially available resins, including chemically catalyzed resins. For purposes of illustration and not limitation, suitable resins include thermosetting polymers or resins such as epoxy, epoxy novalocs, polyesters, polyimides, phenolic resins, and others which exhibit advantageous properties for the composite to be fabricated.

As will be explained herebelow, the vessel chamber 10a (10a') is fluid pressurized to an elevated isostatic pressure greater than the resin pressure in the molding cavity MC (MC') by fluid pressurizing means during at least some portion of the resin infiltration of the fiber reinforcement material 40 (40') in the molding cavity MC (MC'). The isostatic fluid pressure can be established concurrently with initiation of resin infiltration or thereafter. However, establishment of isostatic fluid pressure upon initiation of resin infiltration may require that the pressure of the resin supplied to the molding cavity MC (MC') be increased to overcome the isostatic fluid pressure in the chamber.

In a preferred embodiment of the present invention, the vessel chamber 10a (10a') is fluid pressurized to elevated isostatic pressure by the pressurizing means described hereabove (including gas pressure source 14 and associated valving 16) so that isostatic fluid pressure is established in the chamber 10a (10a') greater than the resin pressure in the molding cavity MC (MC') after initial infiltration of the fiber reinforcement material by the pressurized resin as evidenced by excess resin exiting the outlet port 30b (30b'). Establishment of isostatic fluid pressure in chamber 10a (10a') at this time during resin infiltration is effective to further remove excess resin through outlet port 30b (30b') and insure complete wetting of the fiber reinforcement material by the resin. Isostatic fluid pressure can be applied until flow of excess resin from the outlet port 30b (30b') stops.

Following isostatic pressure infiltration of the fiber reinforcement material with resin, the present invention envisions heating the resin-infiltrated fiber reinforcement material in the pressurized chamber 10a (10a') to partially or fully cure the resin. Suitable heating means is schematically shown for purposes of illustration and not limitation as electrical resistance wires 80 (80') disposed in the chamber 10a (10a') proximate the compliant molding tool 30 (30'). Typically, the electrical resistance wires 80 (80') are disposed on the compliant tool 30 (30') or incorporated into a layered compliant tool structure. For example, the electrical resistance wires can be incorporated in a compliant tool having an innermost butyl rubber layer for contacting the reinforcement material and intermediate and outer layers of fiberglass reinforced silicone or butyl rubber with the electrical resistance wires (e.g. 2.9 ohm electrical resistance wire for a 220 volt power source) disposed between the fiberglass reinforced rubber intermediate and outer layers. The electrical resistance wires are arranged between the fiberglass reinforced rubber layers in a suitable wire pattern effective to uniformly heat the resin infiltrated reinforcement material to provide uniform curing of the resin.

Those skilled in the art will appreciate that other heating means can be employed to practice the present invention. For example, a conventional pressurized and heated autoclave (not shown) is advantageous to this end since it can be gas pressurized to provide the isostatic fluid pressure condition described hereabove and heated as required to cure the resin infiltrated fiber reinforcement material.

In practicing a method embodiment of the present invention using apparatus illustrated in FIG. 1, the fiber reinforcement material 40 is positioned on the molding surface 20a of the rigid molding tool 20 in the chamber 10a. The compliant molding tool 30 then is clamped on the rigid tool 20 snuggly against the fiber reinforcement material to form a molding cavity MC in which the fiber reinforcement material is housed. Then, a suitable resin is pumped by resin pump 50 under pressure to the molding cavity MC via inlet port 30a so as to infiltrate the fiber reinforcement material 40 with the resin. When excess resin is observed to exit the outlet port 30b, the chamber 10a is fluid pressurized (e.g. gas pressurized) to provide isostatic pressure therein greater than the resin pressure in molding cavity MC to provide further resin infiltration and squeeze excess resin from the outlet port 30b to increase the fiber-to-resin volume ratio. The isostatic pressure typically is selected in the range from about 10 to about 100 psi when the resin pressure in the mold cavity MC is from about 10 to about 100 psi. Typically, prior to curing the resin of the infiltrated reinforcement material, the pressure in the chamber 10a and resin pressure in the compliant tool 30 are generally equalized, or alternately the chamber pressure is made just slightly higher than the resin pressure in order to consolidate the resin infiltrated reinforcement.

In practicing a method embodiment of the present invention using apparatus illustrated in FIG. 2, the fiber reinforcement material 40' is positioned snuggly in the complaint or flexible (e.g. rubber) bag 30', and the bagged fiber reinforcement material 40' is placed on the molding surface 20a' of the rigid molding tool 20' in the chamber 10a'. The bagged fiber reinforcement material 40' is held in place on the molding surface 20a' by gravity or by free standing locators, such as locator pins, recesses and the like (not shown), on the rigid molding tool. Then, a suitable resin is pumped by pump 51' disposed in the chamber 10a' under elevated pressure to the molding cavity MC' via inlet port 30a' so as to infiltrate the fiber reinforcement material 40' with the resin. When excess resin is observed to exit the outlet port 30b', the chamber 10a' is fluid pressurized (e.g. gas pressurized) to provide ambient isostatic pressure therein greater than the resin pressure in the molding cavity MC' as described hereabove.

After the fiber reinforcement material 40 (40') is isostatic pressure infiltrated, the resin preferably is partially or fully cured by heating the resin-infiltrated fiber reinforcement material in the pressurized chamber 10a (10a') using electrical resistance wires 80 (80'). Typically, prior to curing the resin infiltrated reinforcement material, the pressure in the chamber 10a and resin pressure in the compliant tool 30 are generally equalized, or alternately the chamber pressure is made slightly higher than the resin pressure, in order to consolidate the resin infiltrated reinforcement. A partially or fully fiber reinforced composite is thereby provided and can be removed from the chamber 10a after cooling and venting of the chamber to the outside ambient atmospheric pressure via vent valve 18.

The present invention can be practiced in the manner described hereabove to fabricate a resin transfer molded, fiber reinforced composite having a relatively large surface area greater than about 10 square feet and a thickness dimension of less than about 0.150 inch, such as from about 0.030 to about 0.125 inch, more particularly from about 0.100 to about 0.125 inch. The present invention thus overcomes the inability of conventional resin transfer molding processes using massive rigid male/female molding tools to produce fiber reinforced composites of the aerospace skin type that have a large surface area and relatively small thickness dimension.

Figure 3:
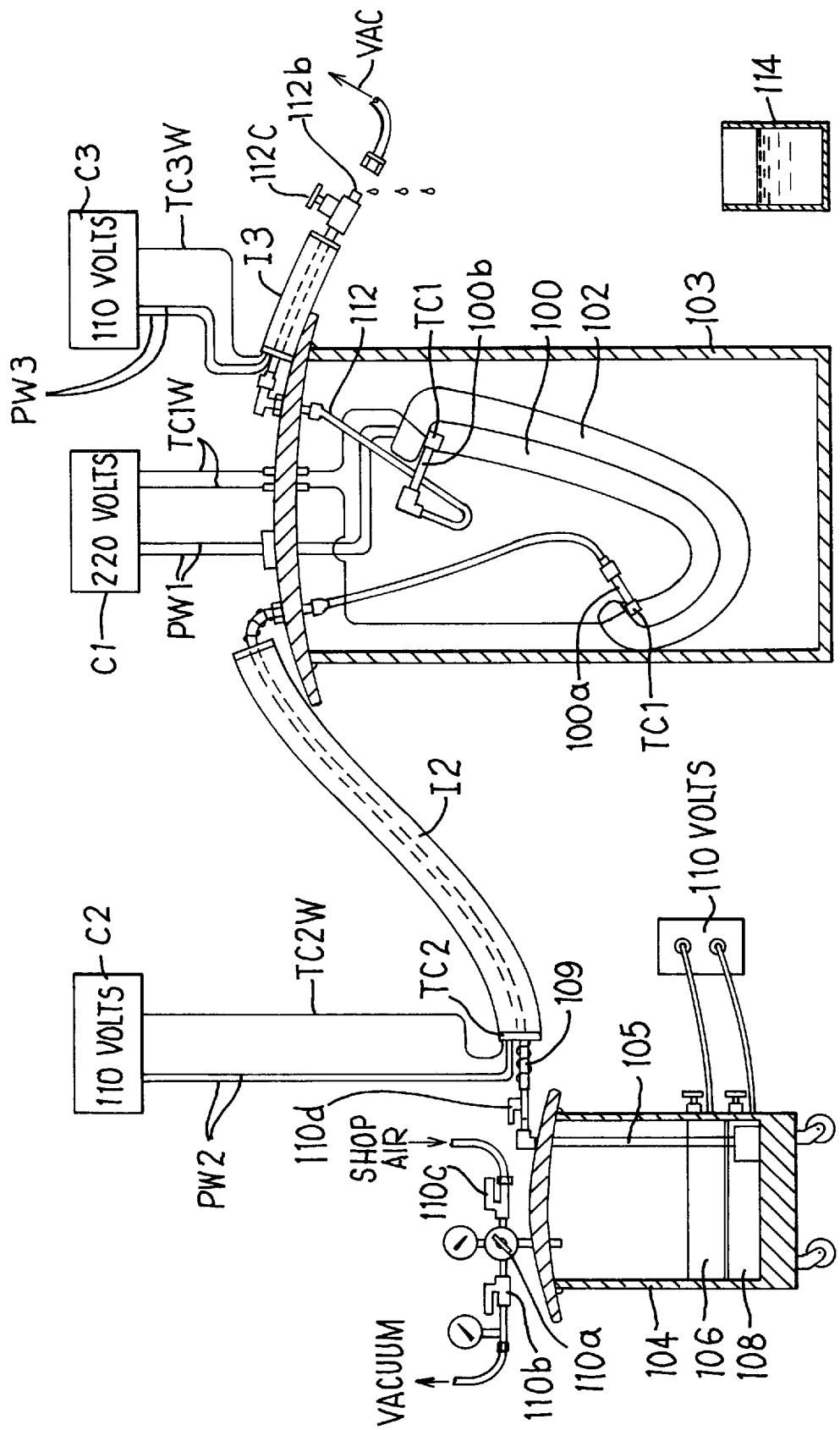
FIG. 3 is a schematic view of apparatus in accordance with still another embodiment of the present invention.

FIG. 3 illustrates a further apparatus embodiment of the invention wherein a compliant bag/fiber reinforcement preform assembly 100 is disposed on a J-shaped mandrel 102 comprising aluminum or other suitable material in a pressure vessel 103. Alternately, the preform can be disposed on the mandrel 102 and then a compliant bag can be snuggly fit over the preform and mandrel to enclose the preform and the mandrel. Electrical resistance heating wires (not shown) wrapped about the periphery of the compliant bag/preform assembly 100, or incorporated in the bag structure as described above, are energized by electrical power wires PW1 of a 220 volt controller C1. Thermocouples TC1 and associated thermocouple wires TC1W are used to provide temperature input signals to the controller C1 to provide appropriate temperature for resin curing.

The compliant bag enclosing the fiber peform includes a resin inlet port 100a for resin entry to infiltrate the preform and resin outlet port 100b communicated to a continuous vacuum for removal of excess resin. Resin is introduced to the inlet port 100a from a resin holding tank 104 via a resin supply tube 105. The resin holding tank 104 includes 110 volt heaters 106, 108 to provide the liquid resin at proper injection temperature. To maintain proper resin temperature, the supply tube 105 is heated outside of the resin holding tank 104 by electrical heating wire 109 therearound energized by power wires PW2 from a 110 volt controller C2. A thermocouple TC2 and associated thermocouple wire TC2W provide temperature input signals to the controller C2. The supply tube 105 is enclosed by a thermal insulation sleeve I2 outside of the holding tank 104.

The resin holding tank 104 includes valves 110a, 110b, 110c that can be manipulated to connect the interior of the holding tank to shop air (compressed air) to pressurize the interior of the holding tank and force the resin upwardly through the supply tube 105 to the inlet port 100a. The valves also can be manipulated to connect the interior of the holding tank 104 to a relative vacuum to drain liquid resin from the supply tube 105 to the holding tank after injection.

A resin discharge tube 112 is communicated to the outlet port 100b of the rubber bag to allow excess resin to exit (e.g. drip) from an exit port 112b to a resin reservoir 114. During resin injection, the exit port 112b is communicated to a continuous relative vacuum provided by a vacuum pump conduit 112c disposed proximate thereto to draw resin from the resin discharge tube 112. During curing, the resin inlet port 100a and resin exit port 112b may be closed off by manipulation of valves 110d and 112d, respectively.

The resin discharge tube 112 is heated outside of the resin holding tank 104 to maintain the resin in liquid state by electrical heating wire therearound (not shown but similar to heating wire 109) energized by power wires PW3 from a 110 volt controller C3. A thermocouple TC3 and associated thermocouple wire TC3W provide appropriate temperature input signals to the controller C3 to this end. The discharge tube 112 is enclosed by a thermal insulation sleeve I3 outside of the pressure vessel 103.

After the preform is initially infiltrated as evidenced by resin exiting the resin exit port 112b, the vessel 103 is gas pressurized by compressed shop air via a valve (not shown in FIG. 3 but similar to valve 16 of FIG. 1) until flow of excess resin from the exit port 112b stops. Prior to curing, the gas pressure in the vessel 103 can be altered to generally equal or slightly exceed the resin pressure in the compliant bag. Then, electrical heating wires disposed about the bag are energized to heat and cure the resin-infiltrated fiber preform in the compliant bag on the mandrel 102 in the pressurized vessel 103.

The following Example is offered to illustrate and not limit the present invention.

EXAMPLE

A braided tubular glass fiber preform was placed on a J-shaped mandrel comprising aluminum or eutectic salt material. Then, a silicone rubber bag was snuggly fit over the braided preform to enclose the preform and mandrel. The rubber bag included an inlet port located at one end of the bag for resin entry and outlet port located at the opposite end of the bag connected to a relative vacuum for removal of excess resin. The bagged preform was placed in a paint pressure pot as a pressure vessel. Epoxy resin (e.g.Dow TACTIX 123 or SHELL EPON 862) was introduced into the inlet port of the bag at a resin pressure of 20–40 psi to infiltrate the preform. After the preform was initially infiltrated as evidenced by resin exiting the resin exit port of the bag, the vessel was gas pressurized by compressed shop air to a pressure of 20 psi until flow of excess resin from the resin exit port stopped. Then, electrical heating wires incorporated into the rubber bag having the layer structure described above were energized (220 volts) for 90 minutes to heat and cure the resin-infiltrated preform in the bag in the pressurized vessel. Prior to resin curing, the pressure in the pressure pot was generally equalized with the resin pressure in the rubber bag. The rubber bag and mandrel then were removed from the J-shaped tubular fiber reinforced composite.

While the invention has been described in detail with respect to certain presently preferred embodiments and features, it will be understood by those skilled in the art in view of the present disclosure that various changes and modifications may be made without departing from the scope of the invention as set forth in the following claims.

We claim:

1. Apparatus for use in making a composite comprising fiber reinforcement material in a resin matrix,
   a) a vessel having walls defining a pressurizable chamber,
   b) a substantially rigid molding tool disposed in said chamber and having a molding surface spaced from said walls,
   c) a compliant molding tool disposed in said chamber relative to said molding surface to form at least in part a molding cavity to receive the fiber reinforcement material,
   d) means for introducing resin under pressure in said molding cavity so as to infiltrate said fiber reinforcement material with said resin, and
   e) means for fluid pressurizing said chamber to provide isostatic pressure externally on said rigid tool and said compliant tool during at least some portion of infiltration of said fiber reinforcement material.

2. The apparatus of claim 1 further including means disposed in said chamber for heating resin-infiltrated fiber reinforcement material in said chamber to cure said resin.

3. The apparatus of claim 2 wherein said means for heating the resin-infiltrated fiber reinforcement material comprises electrical heating wires operably associated with said compliant tool.

4. The apparatus of claim 1 wherein said vessel comprises an autoclave.

5. The apparatus of claim 1 wherein said rigid tool comprises said molding surface and said compliant tool is disposed on said molding surface.

6. The apparatus of claim 5 wherein said compliant tool comprises a membrane overlying said molding surface.

7. The apparatus of claim 6 further comprising means disposed in said chamber for releasably clamping said membrane on said rigid tool.

8. The apparatus of claim 5 wherein said compliant tool comprises a bag surrounding said fiber reinforcement material and disposed on said molding surface.

9. The apparatus of claim 1 further comprising a caul member disposed between said compliant tool and rigid tool.

10. The apparatus of claim 1 wherein said means for introducing said resin comprises a resin pressure pump disposed external of said chamber.

11. The apparatus of claim 1 wherein said means for introducing said resin comprises a resin pump disposed in said chamber.

* * * * *